Nov. 6, 1956

H. J. McCARTHY 2,769,936

ELECTRODE STRUCTURE FOR MULTIPLE SECTION
BROAD-BAND TRANSMIT RECEIVE TUBES

Filed April 15, 1954

INVENTOR.
HENRY J. McCARTHY
BY Edgar O. Rost
ATTORNEY

*INVENTOR.*
HENRY J. McCARTHY
BY Edgar O. Rost
*ATTORNEY*

United States Patent Office 2,769,936
Patented Nov. 6, 1956

2,769,936

ELECTRODE STRUCTURE FOR MULTIPLE SECTION BROAD-BAND TRANSMIT RECEIVE TUBES

Henry J. McCarthy, Danvers, Mass., assignor to Bomac Laboratories Inc., Beverly, Mass., a corporation of Massachusetts Application April 15, 1954, Serial No. 423,498

1 Claim. (Cl. 315—39)

The present invention relates to broad-band transmit receive tubes for balanced duplexers, and, more particularly, to novel ignitor electrode structure for multiple wave guide section transmit-receive tubes sharing a common wall between each section.

An illustrative transmit-receive tube for use with short-slot hybrid junction couplers to form a balanced duplexer has been described and claimed in copending application of Harold Heins, Serial No. 417,375, filed March 19, 1954, assigned to the assignee of the present application. This embodiment comprises a plurality of rectangular wave guide sections in side by side relationship defining a common narrow wave guide wall. Since the transmit-receive tube functions in a duplexer as an impedance changing device, an ionizable atmosphere is provided having a predetermined break-down voltage potential. It is common in the art to provide an ignitor electrode to aid in the main gaseous discharge by partially ionizing said gaseous atmosphere. In the previous mentioned embodiment, plural ignitor electrode structure has been provided to facilitate this partial ionization. Such electrode structure requires additional voltage supply circuitry for the ignitor electrode in each wave guide section. Any change in one of said plural ignitor electrodes due to built up metallic deposits on the electron emitting surface may result in an increase in voltage required for the direct current discharge. This phenomena leads to loss of effectiveness and, since both wave guide sections must have equal electrical characteristics to provide for equal phase shift in the balanced duplexer, the duplexing action may be hampered.

It is, therefore, an object of the present invention to provide a single ignitor electrode structure for a multiple wave guide section transmit-receive tube having a common narrow wave guide wall.

It is a further object to provide a single ignitor electrode for dual section transmit-receive tubes thereby reducing external ignitor electrode circuitry and assuring equal electrical characteristics in the individual wave guide sections.

The objects, features and advantages of the present invention will be more readily appreciated after consideration of the following detailed specification and accompanying drawings, in which.

Figure 1:
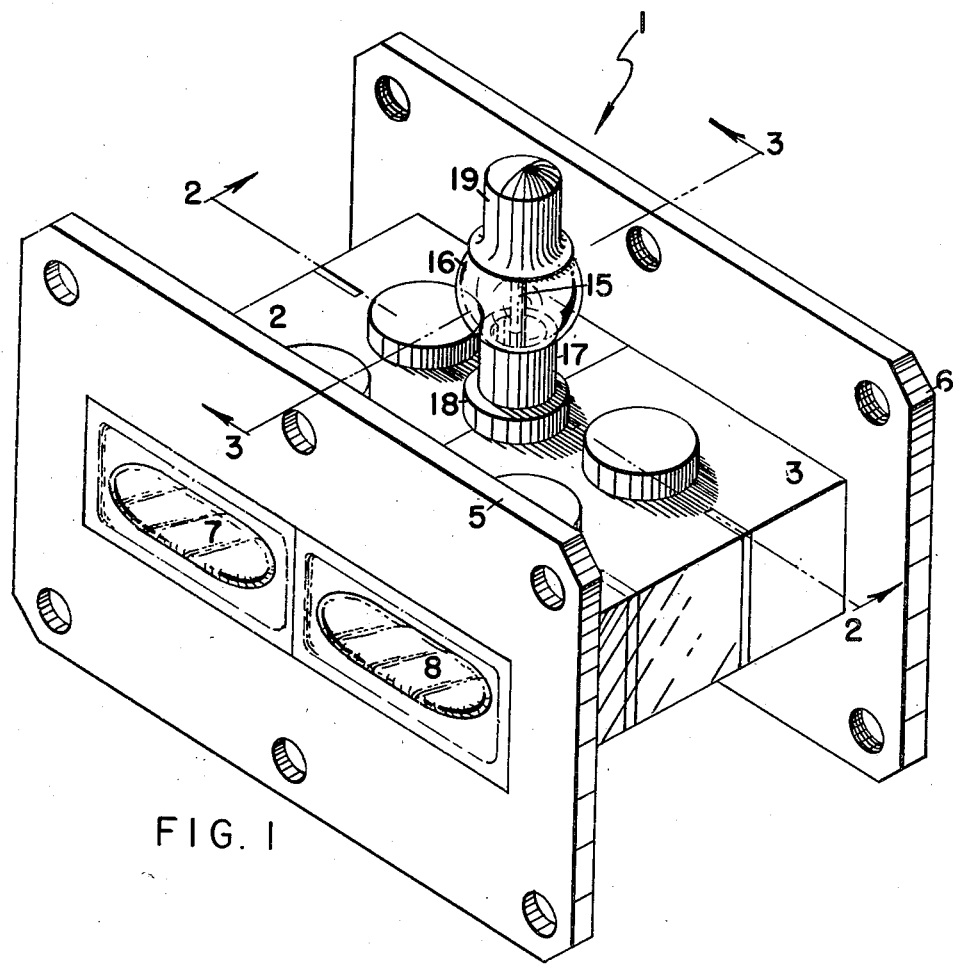
Figure 1 is an enlarged perspective view of the illustrative embodiment.

The overall wave guide structure of the illustrative embodiment has been described in detail in the aforementioned application, and will now be reviewed briefly to provide a better understanding of the present invention.

As shown in the drawings, the transmit-receive tube 1 comprises a pair of similar rectangular wave guide sections 2 and 3 joined in side by side relationship and defining therebetween a common narrow wave guide wall 4. Flanges 5 and 6 are provided at each end of the joined wave guide sections to facilitate mounting in wave guide structure. Each wave guide section is provided with a resonant window at each end thereof to transmit electromagnetic energy through the tube. Two such windows at the input end of said tube are shown as at 7 and 8.

Extending transversely within each section are spaced metal plates 9 forming therebetween irises 10. Within each iris are resonant discharges gap electrodes 11 and 12 of a general frusto conical shape. Electrodes 12 may be axially adjustable to the resonant frequency and are retained in the desired position by a nut 13. Generally, two pairs of resonant discharge gap electrode structure and spaced metal plates are found in broad-band transmit-receive devices operative in a frequency range of from 8500 to 9600 megacycles.

Figure 2:
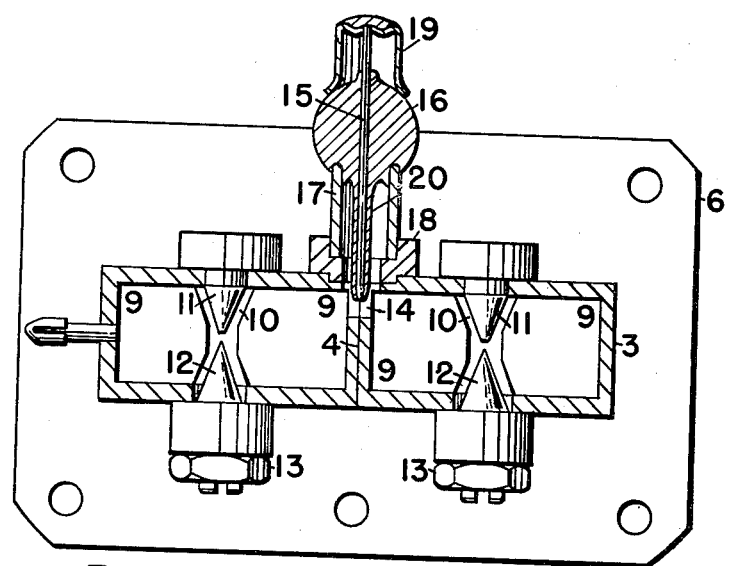
Figure 2 is a detailed transverse cross-sectional view along the line 2—2 in Figure 1.
Figure 3:
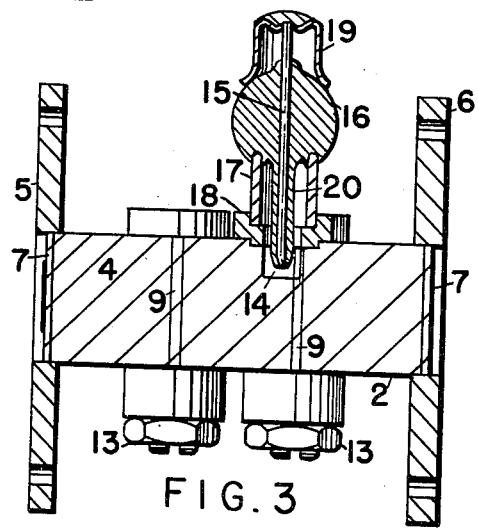
Figure 3 is a detailed longitudinal cross-sectional view along the line 3—3 in Figure 1.

To facilitate partial ionization of the gaseous atmosphere, a feature of the invention resides in providing a single ignitor electrode common to both wave guide sections to thereby supply a source of electrons to the discharge gap. As shown in Figures 2 and 3, I first provide in the common narrow waveguide wall 4 indentation 14 having a diameter slightly larger than the diameter of the ignitor electrode 15 and extending below the top wave guide wall a distance sufficient to allow for exposure of the inner tip of said electrode 15 to the interior of wave guide sections 2 and 3. Upon assembly of the top wide wall of sections 2 and 3, the indentation 14 defines a passage for the introduction of a common gas filling in both wave guide sections. Ignitor electrode 15 having a core of a conductive metal is supported by means of glass bead 16 sealed to metallic sleeve 17 which is in turn hermetically sealed to ring 18 mounted on the top wall of the joined wave guide sections 2 and 3. A terminal cap 19 provides connection means for a suitable direct current voltage supply. An insulating sheath 20 of a dielectric material surrounds the portion of the core of electrode 15 extending below the bead 16.

Desirably, the ignitor electrode structure should be positioned as close to the spaced metal plates 9 as possible in order to supply the source of electrons in the region adjacent the resonant discharge gap between electrodes 11 and 12. In the preferred embodiment, an ignitor electrode having an approximate tip diameter of .025 inch was introduced a distance of approximately .005 inch below the top wall of the joined wave guide sections.

It will be evident that the singular ignitor electrode structure disclosed eliminates not only the electrical disadvantages of the dual structure, but simplifies fabrication and reduces manufacturing costs.

What is claimed is:

A broad-band transmit-receive tube for use in a balanced duplexer system, said tube comprising a plurailty of mutually parallel wave guide envelope sections of rectangular cross section having broad and narrow walls, said wave guide sections being joined together with each section sharing a common narrow wall throughout its length with an adjacent section, said common narrow wall having an indentation at an intermediate point of one edge thereof defining with the upper broad walls a passage for a gaseous atmosphere introduced into said wave guide sections, a laterally glass-sheathed and bare-ended ignitor electrode extending into said passage with the bare-end of said electrode spaced from bottom edge of said indentation to define therewith a discharge gap.

References Cited in the file of this patent
UNITED STATES PATENTS

| | | |
|---|---|---|
| 2,586,993 | Riblet | Feb. 26, 1952 |
| 2,593,429 | Foulkes | Apr. 22, 1952 |
| 2,680,207 | Booth | June 1, 1954 |